F. F. Cornell, Jr.,
Cotton Press.
No. 2,101. Reissued Nov. 7, 1865.
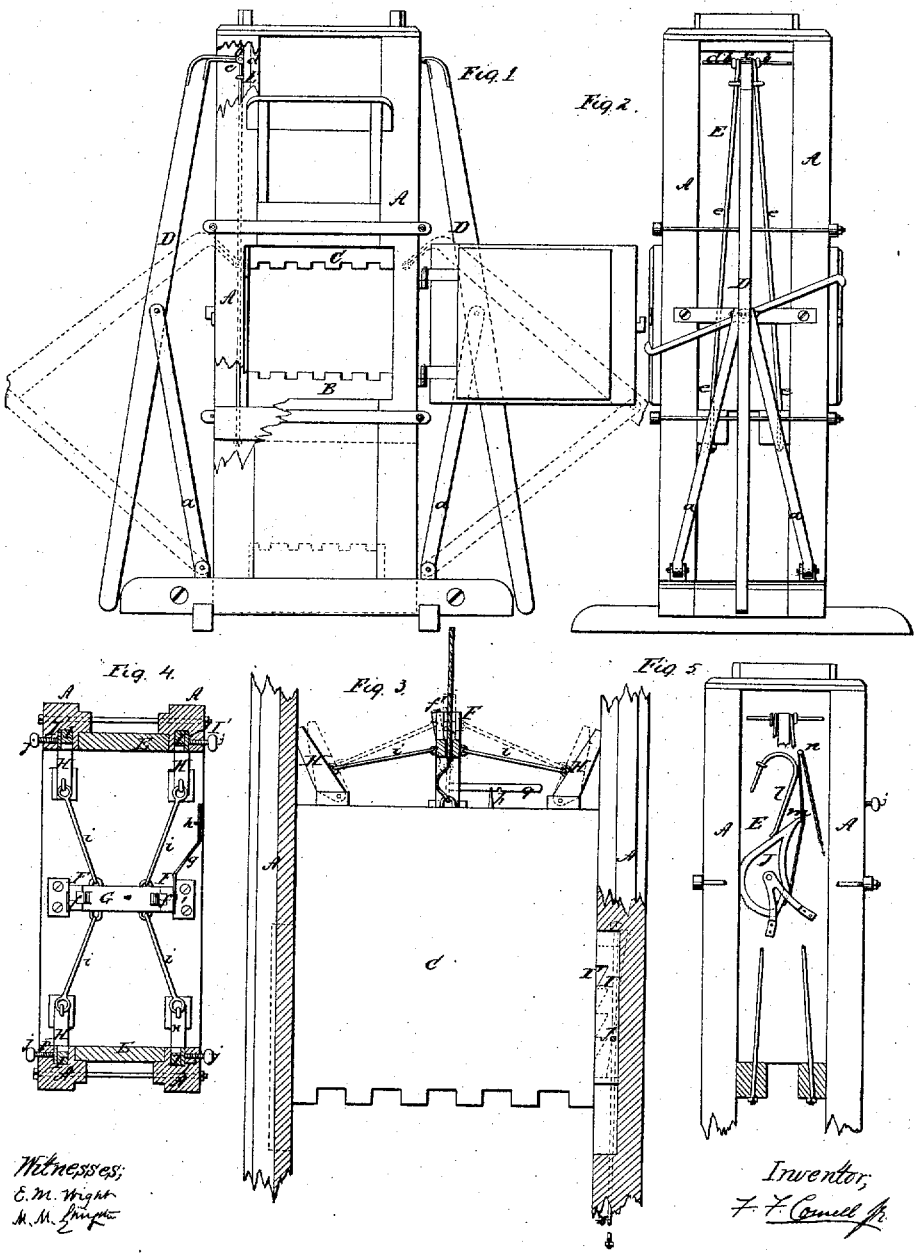
Witnesses;
E. M. Wright
M. M. Knight
Inventor;
F. F. Cornell Jr.
AM. PHOTO-LITHO. CO. N.Y. (OSBORNE'S PROCESS)

UNITED STATES PATENT OFFICE.

FREDERICK F. CORNELL, JR., OF NEW YORK, N. Y.

IMPROVEMENT IN BALING-PRESSES.

Specification forming part of Letters Patent No. 48,261, dated June 20, 1865; Reissue No. 2,101, dated November 7, 1865.

*To all whom it may concern:*

Be it known that I, FREDERICK F. CORNELL, Jr., of the city of New York, in the county and State of New York, have invented certain new and useful Improvements in Baling-Presses; and I do hereby declare that the following is a full, clear, and exact description of the same, reference being had to the accompanying drawings, making part of this specification.

This invention relates to a new and improved form of beater baling-press, being of a novel and improved construction and combination of parts, as hereinafter fully shown and described, and it also relates to some improvements applicable to other forms of baling-presses.

The invention consists, first, in combining parts heretofore well known and in common use but never before used in connection with each other—to wit, a suspended follower operated by toggle-levers with a beater used as a head-block; second, in securing to the traveling sides (heretofore patented to me) staples or eyes capable of receiving through them and through an eye in the shank of the levers or the levers themselves a suitable bolt, and in attaching to the said bolt or its equivalent one or more rods which pass down the ends of the press and are secured to the follower; third, in the employment or use of pawls, so arranged on the top of the beater that they will remain out of gear during the beating operation, but will automatically catch into recesses in a suitable rack provided for the purpose in the framing of the press, and thus hold the beater in place for a head-block against which to press the hay or other substance in the press-box; fourth, in the employment or use of a cam, so arranged on the traveling sides or follower that it will bear against the posts of the frame and prevent a sudden descent of the follower, but will not interfere with its ascent.

In the accompanying drawings, Figure 1 is a side elevation of a beater baling-press. Fig. 2 is an end view of the same, showing the manner in which I attach the levers to the traveling sides and follower. Fig. 3 is a view showing the device I use to secure the beater in position when it is to serve as a head-block, in which figure the beater is shown as descending for the last time before being used as a head-block. Fig. 4 is a plan or top view of the same. Fig. 5 is an end view of a portion of a press, showing the cam I employ for holding the traveling sides, and consequently the follower, from falling during the pressing operation should any relaxation of the power employed for pressing occur.

In the following description I shall only designate by letters such portions of the press as it will be necessary to refer to in order to give a clear understanding of my present combinations and improvements and their application to baling-presses.

A A represent the upright posts; B, the follower suspended from the ends of the levers, and C the beater, which latter, after the beating operation, answers the purpose of a head-block against which to press the hay or other substance to be pressed. D D are the levers, and *a a* are the radii of a toggle-joint or the fulcrum-levers. To the lower end of the levers D D are attached the ropes or chains in the usual manner for operating the follower for the purpose of compressing the bale. These parts are all of the ordinary or any suitable construction. In the traveling sides E E, a suitable distance from their top, are driven staples or eyes *b b*, sufficiently far apart to admit between them the end of the lever, which has an eye, *c*, in its shank capable of receiving through it and the staples or eyes aforesaid a fulcrum-pin, *d*, for securing them together. From this pin *d* are hung one or more rods or bars, *e e*. These extend down along the ends of the press, and are connected and secured firmly to the follower B, as shown clearly in Fig. 2. They are sufficiently strong to bear any strain upon them through the levers D necessary to draw up the follower suspended from the ends of the said levers, so as to compress a bale as compactly as possible.

Reference may now be had to Figs. 3 and 4 of the drawings, which show the manner I adopt for holding the beater in place when it is desired to use it for a head-block. F F represent two standards, arranged on top near the center of the beater and transversely therewith, and secured to it in any suitable manner. On the inner faces of these standards there is formed a groove, which serves as a guide for a cross-beam, G, having a vertical motion. Through this cross-beam and secured to it is passed the chain or rope, by means of which the beater is raised. The same is afterward secured to the beater, leaving a sufficient length of the same between said cross-beam G and the point of attachment to the beater, so that when the said rope is tightened and the cross-beam raised thereby the pawls, hereinafter described, are drawn out of the notches and the beater is raised, as hereinafter fully shown. On this cross-beam there are formed lugs or projections *f*, with a notch cut in their faces for receiving a detent-rod, *f'*, which is hinged to the sides of the standards F F, and operated by a lever, *g*, which throws it into or out of gear, as may be desired, and retains it in such position by means of notches, which engage with a peg, *h*, suitably arranged for that purpose, all of which is clearly shown in the Figs. 3 and 4 referred to. H H are the pawls, (four in number,) which are hinged in a suitable manner near each end of the beater on the top thereof, and connected with the cross-beam G by rods *i*, as shown clearly in the figures referred to. These pawls have their faces or ends beveled, so as the more surely to catch into the racks I I', provided for that purpose. These racks I I' are set into the upright posts A. The racks I are stationary, and have several teeth cut into them suitable for detaining the pawls at the proper time. The racks I' are, more correctly speaking, adjustable slides having but one tooth, which in shape corresponds with the teeth of the racks I. These slides I' are removable, and can be used or not, as desired, and when so removed and not used, the racks I will regulate the density of the material pressed, giving to each bale a corresponding density, since the compressing force of the beater, at its last blow and after the pawls are thrown out, will carry it to such a point that at its rebound the pawls will catch in some one of the notches or teeth of the rack I, according to the amount and kind of substance or material to be pressed. When, however, the slides I' are used, their office is this: Oftentimes it is very desirable to have all the bales of exactly the same size, as they can be better stored for transportation, a few inches difference in any dimension of a bale often making considerable objection for storing. Now, these slides I' may be so adjusted as to compel all the pawls, as the beater rebounds after the last stroke, to catch in particular and corresponding notches in the racks I, and, as the teeth in the rack I in a full-sized press will be several inches apart, the advantage of this slide I', which is removable and adjustable by means of the screw-pins *j*, are apparent. The racks I do not depend solely on their position in the posts or frame of the press for security against displacement. A rod, *z*, (shown in Fig. 3,) is run through each of them and secured to the bottom of the press. These enable the racks so held to bear, without liability of displacement, any pressure that may be brought against them by the beater through the medium of the pawls H H. The rods *z* also serve to strengthen the whole framework of the press, as will be readily understood.

Reference may now be had to Fig. 5. J represents a cam, which, in this instance, is pear-shaped. It is pivoted to the traveling side E in a suitable manner and in such way that its edge will bear against the post A of the press, one such being provided for each side. The said cam is so shaped and arranged as to permit the traveling side E to rise freely, but so as to prevent the same from descending unless it be thrown out of place for that purpose. A spring, *l*, is arranged above this cam for forcing back the same after it has been held out of place by the string *m* being fastened to the peg *n*, especially for that purpose, as clearly shown in Fig. 5. This cam may be affixed to the side, as hereinbefore shown, or to the follower itself, and secure the same result, as will be readily seen.

The operation of the press so far as effected by my improvements is as follows: The quantity of hay intended for the bale is fed in the press and packed by the beater in the usual way. Now, just as the beater is being raised for its last descent the detent-rod *f'* is thrown out of the notches in the projection *f* and the beater is drawn up, the position of the parts at this stage being shown in red in Fig. 3. The beater descends and rebounds, and the pawls now falling against the posts A slide up and sink into the recesses intended for their reception in the rack I. The beater is now firmly held and at once becomes the head-block of the press. The levers are then drawn down in the usual way and the follower, which is suspended from the ends of the levers, is drawn up and crowds the substance or material to be pressed up against the beater, which is secured and held as a head-block or fixed head, and it is compressed into the bale and bound in the usual or any manner. Now, during the operation of pressing, should anything break, or should the power operating the press suddenly slacken for any cause, the follower is prevented from falling by means of the cam J. Thus it will be seen that I combine a suspended follower with a beater, which latter, having performed its beating function, becomes fixed and performs the function of a head-block; that I provide a safe and strong fastening for the levers to the traveling sides and follower; that I provide a reliable and automatic arrangement for holding the beater in place to make it serve as a head-block to the press; that I provide a means for regulating the size, or, if preferred, the density, of the bale; that I provide a means for retaining the follower in its place should any accidental or intentional relaxation or stoppage occur during the operation of pressing, all of which are of great utility and advantage.

I do not confine myself to the precise details as herein described.

I do not claim the use or employment, in a beater bailing press, of a beater used as a fixed head, in combination with a follower supported by a power applied underneath the same, for I am aware that such combination has been long in use; but What I do claim, and desire to secure by Letters Patent, is—

1. The employment or use in a beater bailing-press of a suspended follower, in combination with a beater used as a fixed head.

2. Connecting the levers D to the sliding sides E and follower B by means of the staples or eyes *b*, and fulcrum-pin *d*, and rods *e e*, or their equivalents, substantially as herein described.

3. The pawls H, so arranged as to engage automatically with the racks I, upon the descent of the beater into the press-chamber, thereby preventing its rebounding, and at the same time holding it in position to serve as a head-block for the press, substantially as and for the purpose herein described.

4. The rack I and slides I′, in combination with the pawls H, as and for the purpose specified.

5. The standards F F and cross-beam G, in combination with the rod *h* and pawls H, arranged to operate substantially as described.

6. The detent-rod *f′*, in combination with the projections *f* and standards F F, substantially as and for the purpose hereinbefore described.

7. The cam J, in combination with the traveling sides E and post A, substantially as and for the purpose herein specified.

F. F. CORNELL, Jr.

Witnesses:
E. M. Wight,
M. M. Livingson.